UNITED STATES PATENT OFFICE.

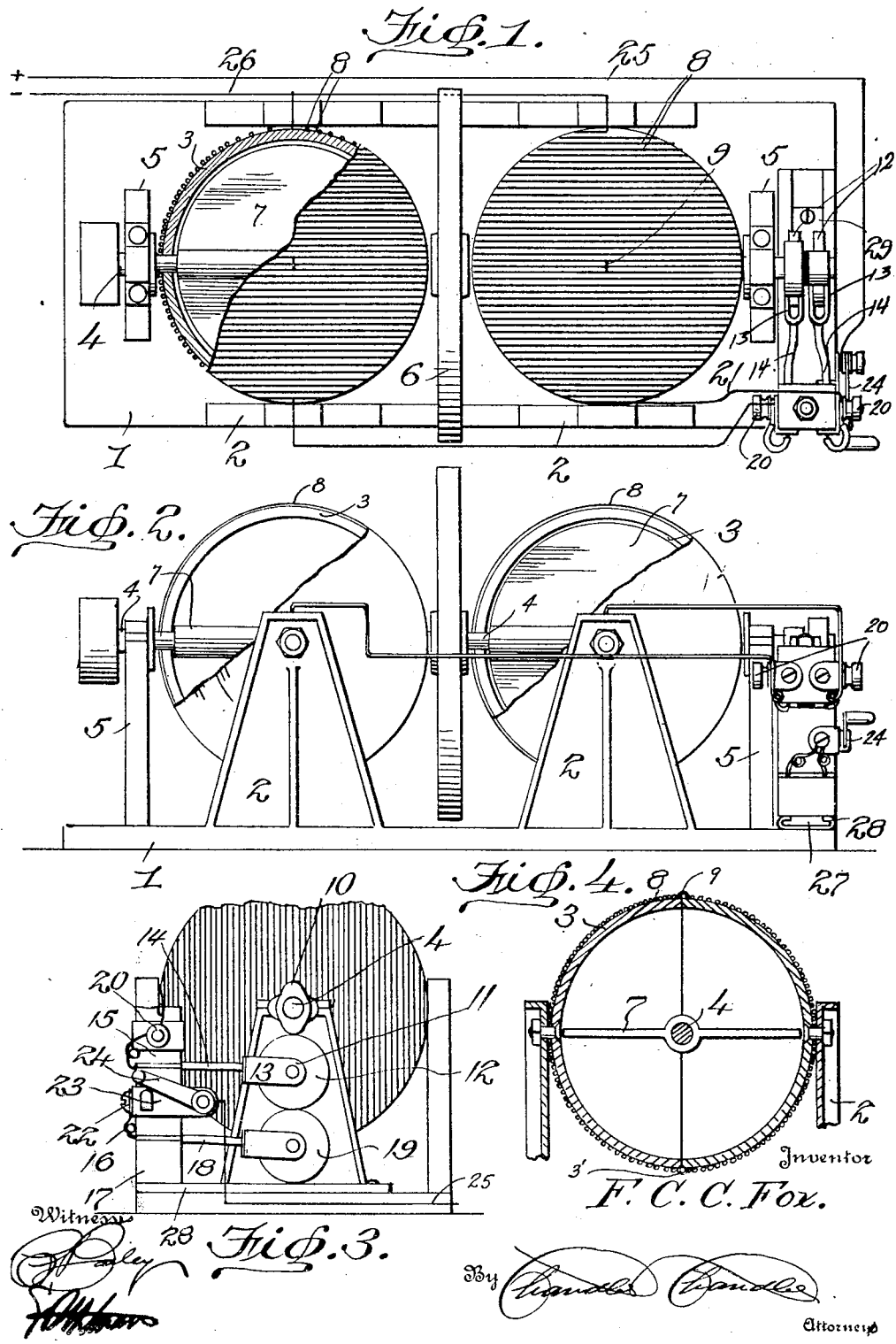

FRANCIS C. C. FOX, OF SAWTELLE, CALIFORNIA.

ELECTRIC MOTOR.

1,354,388.  Specification of Letters Patent.  Patented Sept. 28, 1920.

Application filed June 16, 1917. Serial No. 175,178.

*To all whom it may concern:*

Be it known that I, FRANCIS C. C. Fox, a citizen of the United States, residing at Sawtelle, in the county of Los Angeles, State of California, have invented certain new and useful Improvements in Electric Motors; and I do hereby declare the following to be a full, clear, and exact description of the invention, such as will enable others skilled in the art to which it appertains to make and use the same.

This invention relates to electric motors.

The object of this invention is to provide a motor of very simple design, in which the field windings are constructed to possess the highest degree of efficiency with a minimum amount of windings and mechanical structure.

It is also an object of the invention to so arrange the armature with relation to the field windings that the lines of force will cut through a maximum area of the armature body, with a consequent increase in the efficiency of the motor. In this connection, it should be stated that the arrangement of the field windings and armature is such that the lines of force cut through the latter at points which lie as practicably close to the field windings as is possible.

As a further object, it is the intention of this invention to provide a simple and durable motor which will be practically non-heating and which, as a general proposition, may be constructed cheaply as a motor for all services of average character.

With the above objects in view, and such others relating to the details of construction as may hereinafter appear, my invention will now be fully set forth and described, reference being had to the accompanying drawings.

In the drawings:—

Figure 1 is a plan view of a motor,

Fig. 2 is a side elevation.

Fig. 3 is an end view with the upper portion omitted.

Fig. 4 is a section taken diametrically through one of the field members and at right angles to the armature shaft.

Referring more particularly to the drawings, 1 represents the base which carries the frames or standards 2 in pairs between which the spherical housing or field winding supports 3 are mounted, preferably two in number, or are arranged in pairs, around a common shaft 4 which has its bearing in the standards 5 which also rise from the base 1. The shaft 4, between the housings 3 carries a fly wheel 6, and within the housings, respectively carries the armature disks 7, the armatures being arranged at right angles to one another, and while cross sectionally filling the interiors of the housings are freely rotatable therein.

The housings or winding supports 3 which are non-metallic, are divided into hemispheres, which are hinged, preferably at the bottom, as shown at 3′ so as to be capable of being swung apart for the reception of the armatures and for purposes of inspection. The windings 8, which may be of one or more layers as desired, completely cover the housings, beginning at one of the points of support of the housings and progressing in spirals toward the other point of support. Also the windings lie in planes parallel to the axis of the shaft 4, and at the juncture of the hemispherical sections of the housings are connected by a coupling 9 which permits the temporary breaking of the windings when it is necessary to open the housings. Thus, the windings begin in spirals of very small diameter at points of support of the spherical housings, and gradually increase in diameter to the parallel plane of the maximum dimension which passes through the axis of the shaft 4. By reason of the windings which are thus built up into spheres, which wholly inclose the armatures 7, the lines of force from the windings traverse the bodies of the armatures throughout the entire perimeter thereof, and also traverse the entire intermediate portions of the bodies in maximum number.

By reason of the right angular relation of the pairs of armatures, a more uniform torque upon the shaft is obtained. Upon one end, the shaft 4 carries a contact actuator 10 which is formed of two insulated metal sections each elliptical and forming a double cam which coöperates with one of a pair of contactors 11. Each of the contactors 11 consists of a disk or roller 12 mounted in a yoke 13 which forms one end of a spring arm 14. The rollers 12 lie side by side, so that they are alternately engaged by the cams. The rear ends of the arms 14 are clamped in insulated relation between an insulating block 15 and a similar block 16. The block 16 is mounted upon a base block 17, and interposed between the blocks 16 and 17 are the connected ends of a second pair of arms 18 which support a second pair of contact disks 19, the resilience of the arms 18 normally holding the disks or rollers 19 out of contact with the disks or rollers 12. The arms 14 are electrically connected to binding posts 20 which are mounted upon the opposite sides of the block 15, the latter in turn are connected to the field windings 8 by means of wires 21, one of the brushes being thereby connected to each of said field windings. The arms 18 which are connected together, are electrically connected to a binding post 22, the latter being mounted upon a switch plate 23 which carries the switch arm 24. The switch arm 24, in turn, has the line wire 25 connected thereto, a return wire 26 from which is connected in series to the opposite sides of the field windings 8.

The alternating contact of the cam elements 10 with the brush rollers 12 throws the latter into alternating contact with the rollers 19, thereby providing for the proper energization of the field windings 8. In order to permit the proper positioning of the brush rollers 12 below the contact actuator 10, I have mounted the contactor mechanism, which includes the blocks 15, 16 and 17 upon a plate 27, which is slidable in a guide-way 28 which is also formed from a sheet of metal and is secured upon the base 1, so that the plate 27 may be moved transversely across the face in order to properly adjust the rollers 12 with relation to the cam elements of the commutator. A suitable locking bolt 29 is provided to lock the plate 27 in its position of adjustment.

From the foregoing description, it will be apparent that I have constructed a motor of few and simple parts, which are arranged to obviate the usual expensive windings of a motor of usual type, and through which the windings which are employed are utilized to cause the greatest possible number of lines of force to traverse the armatures.

What I claim as my invention is:—

An electric motor comprising a plurality of alined spherical field windings the convolutions of which are coaxial, a shaft extending through all of the windings parallel to the convolutions thereof, armatures mounted upon the shaft each within a winding at angles to each other, and means for energizing the windings alternately.

In testimony whereof I affix my signature in the presence of two witnesses:

FRANCIS C. C. FOX.

Witnesses:
ANDREW J. THOMPSON,
WM. H. YOUNG.